2,107,165
Patented Oct. 15, 1963

3,107,165
PURIFICATION OF TANTALUM METAL BY REDUCTION OF THE OXYGEN CONTENT BY MEANS OF CARBON
John L. Ham, Wellesley Hills, and Maurice L. Torti, Jr., Boston, Mass., assignors to National Research Corporation, Cambridge, Mass., a corporation of Massachusetts
No Drawing. Filed Oct. 12, 1961, Ser. No. 144,569
4 Claims. (Cl. 75—10)

The present invention relates to refractory metals and more particularly to the purification of tantalum metal by vacuum arc melting. This application is in part a continuation of our copending application Serial No. 811,527, filed May 7, 1959, now abandoned.

Tantalum metal has traditionally been produced by the powder metallurgy route in which a lengthy high temperature vacuum sintering treatment is utilized for refining to the purity necessary for fabrication.

The general extension of vacuum arc melting as a method for consolidating the refractory metals has prompted wide interest in the arc melting of tantalum. Although fabricable ingots have been produced from tantalum powder of conventional purity, the purity and ductility of these ingots have not matched good sintered bar material since sufficient refinement was not obtained during arc melting.

Accordingly, it is the principal object of this invention to remove oxygen impurities of tantalum metal during vacuum arc melting.

Another object of the invention is to provide for substantial purification of tantalum metal by a single arc melt.

Still another object of this invention is to provide tantalum metal having the lowest carbon-oxygen sum for a single arc melt.

Other objects will become apparent and the invention better understood from a consideration of the following examples and description.

According to the present invention, it has been determined that the lowest, most uniform oxygen impurity level, together with the lowest carbon-oxygen sum for a single arc melt, result when the carbon in the tantalum electrode is on the order of 50 to 75 percent of the stoichiometric carbon-oxygen ratio for complete removal of the oxygen as carbon monoxide. When the carbon addition to the electrode material is appreciably less than about 50 percent, oxygen impurities remain undesirably high in the ingot. When the carbon addition to the electrode is in excess of about 75 percent of the stoichiometric carbon-oxygen ratio for carbon monoxide removal, the resulting ingot, although substantially reduced in oxygen, has an undesirably high carbon content. The addition of carbon in excess of about 75% also has the disadvantage that significant amounts of tantalum carbide are formed which also spoil the properties of the tantalum metal.

It is understood that it is essential to use high purity melt stock having an oxygen content of less than 0.1% (less than 1000 p.p.m.) so that the present invention will yield ingots of extremely high purity and ductility.

Ingots produced by a single arc melt and in accordance with the teachings of the present invention can, for example, be fabricated cold from ingot to a 0.0005 inch thick strip without intermediate anneals.

While the exact mechanism by which the present invention operates is not fully understood, it is postulated that the oxygen impurities are in solution during the arc melting of the tantalum metal. Accordingly, it has been further postulated that, during the melting operation, oxygen is in part removed as volatile tantalum oxides and in part removed as carbon monoxide. While the relationship between the amount of carbon added and the removal of carbon and oxygen as volatiles is not fully understood, it has been determined that the lowest oxygen impurity levels together with the lowest carbon oxygen sum for a single arc melt are obtained when the carbon in the tantalum electrode is about 50 to 75% of the stoichiometric carbon-oxygen ratio for carbon monoxide removal.

For producing high purity tantalum metal in accordance with the present invention, it is essential that the tantalum be melted at a sufficiently low melting rate and at a sufficiently low pressure to insure removal of volatile impurities.

In accordance with the present invention the melting is carried out at a pressure of less than 25 microns Hg abs. and preferably at less than 10 microns Hg abs. The tantalum electrode is preferably melted at a rate corresponding to a power input in excess of 1 kw.h./lb. to provide that any given particle or unit of tantalum metal is molten for a time in excess of 2 minutes and preferably in excess of 5 minutes, whereby removal of volatile impurities is substantially completely effected.

The time any given unit of metal remains molten is determined in the following manner. If the conditions of power input, pressure and cooling are constant, it can be assumed that the molten bath volume is constant for a given metal when melted into a mold of given diameter. Assuming that each unit of molten material leaving the electrode moves through the bath at the same rate, then the time molten for each unit is equal to the weight of the bath in pounds divided by the melt rate in lbs./minute. It is apparent then that, for a given molten bath, the molten time will be greater with lower melt rates and thus provide for greater purification of the electrode material.

Thus, by the term "time molten" (as used in the specification and claims) it is meant the bath weight in lbs. divided by the melt rate in lbs./minute.

In the following examples, illustrative of the present invention, all melting was done in a conventional cold mold arc furnace. Power was supplied by a bank of welding generators capable of supplying 5600 amperes. A mechanical booster high vacuum pump backed by a mechanical pump comprised the pumping system. A nominal 4-inch diameter cold mold was used. Since copper pipe was installed as the mold liner, the actual inner mold diameter was 3.5 inches.

The melt stock was tantalum powder having a minus 12 to plus 325 mesh. Bars, 1¾ to 2 inches in diameter, were hydrostatically pressed from this powder. These bars were given a quick pre-melting treatment in which direct resistance heating was used to heat the bars to 1500° C. for approximately one minute in vacuum. This operation dimensionally stabilizes the bars, improves the green strength and removes hydrogen, if present. No significant oxygen removal is obtained, of course, for such a short heating period. The bars are then welded into the electrode using a tungsten permanent electrode in an argon atmosphere.

The melts were run at 30 volts, 4500 to 5000 amperes, and at about 2 to 5 microns Hg abs. pressure measured in the furnace body. The average melting rate was about 0.5 lb./min. This corresponds to a power input of approximately 4 to 5 kw.h./lb. and a time molten of about 10 minutes. The molten pool, which was about 5 lbs., was stirred by a 500 turn, D.C. adjustable amperage stirring coil. Approximately 3 amperes was sufficient to stabilize the arc and gently stir the pool without undue agitation.

The invention will now be described by way of nonlimiting examples wherein the equipment and procedure is as described above, the carbon addition only being varied.

*Examples 1 to 14*

In this series no carbon was added to the melt stock. The average oxygen content in the formed electrodes was 140 p.p.m. and the average carbon content was 15 p.p.m. The ingots formed had average oxygen at the top of 106 p.p.m. and at the bottom 46 p.p.m. The average carbon content at the top was less than 10 p.p.m. and at the bottom 13 p.p.m. It is noted that significant amounts of oxygen are removed, particularly at the ingot bottom. Since oxygen is probably removed as volatile tantalum oxides, a portion of the oxides may deposit on the upper mold wall above the melt. The fact that this oxide film must be either driven up or redissolved in the melt would account for the fact that the oxygen content at the top, although slightly lower than the melt stock, is greater (almost double) than the oxygen content at the ingot bottom. Accordingly, the top and bottom of the ingots were analyzed for oxygen and carbon.

*Examples 15 to 25*

In this series, carbon in the form of fine graphite powder was thoroughly mixed with the tantalum powder. The carbon was added in an amount sufficient to raise the carbon oxygen ratio to about 50% of the stoichiometric ratio for carbon monoxide removal. The average oxygen content in the electrodes was 239 p.p.m., the average oxygen content in the ingots was 65 p.p.m. top and 34 p.p.m. bottom. The average carbon in the electrodes was 111 p.p.m. (including the carbon additions), the average carbon content in the ingots was 23 p.p.m. top and 30 p.p.m. bottom.

*Examples 26 to 33*

In these examples sufficient carbon in the form of graphite powder was added to the tantalum powder to raise the carbon-oxygen ratio to 75 percent of the stoichiometric ratio for carbon monoxide removal. The average oxygen content of the tantalum powder was 284 p.p.m.; the average oxygen in the ingot was 32 p.p.m. The average carbon content in the electrode was 160 p.p.m. (including the carbon addition); the average carbon in the final ingot was 31 p.p.m.

*Example 34*

In this example, carbon in the form of a suspension of graphite in a volatile liquid (ethyl alcohol for example) was applied, by painting, to the electrode surface. Sufficient carbon was applied to raise the carbon-oxygen ratio to 50% of the stoichiometric ratio for carbon monoxide removal. The oxygen content of the electrode was 350 p.p.m., the oxygen content of the ingot was 64 p.p.m. top and 15 p.p.m. bottom. The carbon content of the electrode was 100 p.p.m. (including the carbon addition), the carbon content of the ingot was 15 p.p.m. top and 40 p.p.m. bottom.

While this embodiment of the invention is less desirable, due to occasional fluctuations in results, it is particularly useful when the melt stock consists of scrap tantalum. Under these conditions, application of the carbon suspension to the electrode surface provides for better dispersion of the carbon addition than when fine carbon powder is mixed with the scrap melt stock.

*Examples 35 and 36*

In these examples, carbon in the form of graphite powder was thoroughly mixed with the tantalum powder. Sufficient carbon was added to raise the carbon oxygen ratio to 100 percent of the stoichiometric ratio for carbon monoxide removal. The average oxygen in the electrodes was 950 p.p.m., the average oxygen in the ingots was 120 p.p.m. The average carbon in the electrodes was 800 p.p.m. (including the carbon addition), the average carbon content in the two ingots was 360 p.p.m. The ingot of Example 36 was remelted and resulted in an ingot having a carbon content of 340 p.p.m. (350 before melt) and an oxygen content of 80 p.p.m. The remelting shows the difficulty of removing an excess of carbon.

*Example 37*

In this example a tantalum —10% tungsten alloy powder mixture was prepared. Sufficient graphite powder was added to the powder to raise the carbon-oxygen ratio to 50 percent of the stoichiometric ratio for carbon monoxide removal. The oxygen content of the tantalum powder was 298 p.p.m; the oxygen content of the ingot was 37 p.p.m. The carbon content of the electrode was 108 p.p.m. (including the carbon addition); the carbon content of the final ingot was 17 p.p.m. Upon remelting the ingot, further purification was negligible.

*Example 38*

This example was the same as Example 37 in all respects except that sufficient graphite powder was added to raise the carbon-oxygen ratio to 100% of the stoichiometric ratio for carbon monoxide removal (191 p.p.m. in the consumable electrode). The oxygen content of the ingot was 24 p.p.m. and the carbon content was 60 p.p.m.

*Example 39*

This example was the same as Example 37 in all respects except that sufficient graphite powder was added to raise the carbon-oxygen ratio to 200 percent of the stoichiometric ratio for carbon monoxide removal (357 p.p.m. carbon in the consumable electrode). The oxygen content of the ingot was 24 p.p.m. and the carbon content was 90 p.p.m.

The present invention is equally applicable to tantalum base alloys as illustrated by Example 37 above.

Thus, for Examples 15 to 34 and 37 (50 to 75% stoichiometric carbon addition) there results an ingot having a carbon and oxygen content each below about 100 p.p.m. together with a low carbon-oxygen sum. In Examples 1 to 14, to which no carbon was added, the resulting ingot had an undesirably high oxygen content. In Examples 35, 36, 38 and 39 (100 to 200% stoichiometric carbon addition) considerable oxygen was removed but the final carbon content was 2 to 3 times that of the oxygen content.

Accordingly, with a given oxygen impurity level, it has been demonstrated that the lowest carbon oxygen sum is obtained in the final ingot when 50 to 75% of the stoichiometric amount of carbon is present during the arc melting.

Therefore, the desired result of low oxygen content, together with the lowest carbon-oxygen sum for a single arc melt is achieved when the carbon addition to the electrode is on the order of 50 to 75 percent of the stoichiometric carbon-oxygen ratio for carbon monoxide removal.

Since certain changes may be made in the above process without departing from the scope of the invention herein involved, it is intended that all matter contained in the above description shall be interpreted as illustrative and not in a limiting sense.

What is claimed is:

1. The process of producing tantalum metal having impurity levels of carbon and oxygen each less than 100 p.p.m., comprising forming a tantalum electrode from tantalum metal having an oxygen content of less than 0.1%, incorporating in said electrode sufficient carbon to provide 50 to 75% of the stoichiometric amount of carbon needed to combine with the oxygen in said tantalum metal to form carbon monoxide, melting said electrode in a vacuum arc furnace at a pressure of less than 25 microns Hg abs. with a power input of at least 1 kw.h./lb. to remove carbon and oxygen and form an ingot of said melted metal.

2. The process of producing tantalum metal having impurity levels of carbon and oxygen each less than 100 p.p.m., comprising forming a tantalum electrode from tantalum metal having an oxygen content of less than 0.1%, preparing a suspension of carbon powder in a liquid by adding to a suitable volatile liquid 50 to 75% of the stoichiometric amount of carbon needed to combine with the oxygen in said tantalum metal to form carbon monoxide, applying said carbon suspension to said electrode, melting said electrode in a vacuum arc furnace at a pressure of less than 25 microns Hg abs. with a power input of at least 1 kw.h./lb. and a time molten of at least 2 minutes to remove carbon and oxygen and form an ingot of said melted metal.

3. The process of producing tantalum metal having impurity levels of carbon and oxygen each less than 100 p.p.m., comprising adding a quantity of carbon to tantalum metal powder having an oxygen content of less than 0.1%, said quantity of carbon together with the amount of carbon present in said metal providing 50 to 75% of the stoichiometric amount of carbon needed to combine with the oxygen present to form carbon monoxide, forming said powdered metal into an electrode, melting said electrode in a vacuum arc furnace at a pressure of less than 25 microns Hg abs. with a power input of at least 1 kw.h./lb. to remove carbon and oxygen and form an ingot of said melted metal.

4. The process of producing tantalum base alloys having impurity levels of carbon and oxygen each less than 100 p.p.m., comprising forming a tantalum electrode from a tantalum base alloy having an oxygen content of less than 0.1%, incorporating in said electrode sufficient carbon to provide 50 to 75% of the stoichiometric amount of carbon needed to combine with the oxygen in said tantalum metal to form carbon monoxide, melting said electrode in a vacuum arc furnace at a pressure of less than 25 microns Hg abs. with a power input of at least 1 kw.h./lb. to remove carbon and oxygen and form an ingot of said melted metal.

References Cited in the file of this patent

UNITED STATES PATENTS

| | | |
|---|---|---|
| 979,363 | Arsem | Dec. 20, 1910 |
| 2,763,541 | Mettler | Sept. 18, 1956 |
| 2,848,315 | Kieffer et al. | Aug. 19, 1958 |
| 2,937,939 | Wilhelm | May 24, 1960 |

FOREIGN PATENTS

| | | |
|---|---|---|
| 671,171 | Great Britain | Apr. 30, 1952 |
| 754,981 | Great Britain | Aug. 15, 1956 |